Jan. 16, 1962     J. MÜHLBEYER     3,017,005
CENTRIFUGAL-FORCE CONTROLLED DELAYED-ACTION TRANSMISSION
Filed Oct. 28, 1959

United States Patent Office 3,017,005
Patented Jan. 16, 1962

3,017,005
CENTRIFUGAL-FORCE CONTROLLED DELAYED-
ACTION TRANSMISSION
Josef Mühlbeyer, Eschborner Landstr. 46,
Frankfurt am Main, Germany
Filed Oct. 28, 1959, Ser. No. 849,410
Claims priority, application Germany Nov. 4, 1958
9 Claims. (Cl. 192—105)

My invention relates to belt sheaves, clutches, friction couplings and similarly operating power transmission devices in which the mechanical coupling between a driving member and a driven member is effected by centrifugal force, and in which the force-transmitting coupling effect between the driving and driven parts is delayed for a selectively adjusted time for such purposes as facilitating the starting of a drive motor.

In a more particular aspect, my invention relates to an improvement of the delayed-action centrifugal coupling device of the type known from German Patent 1,015,278 and U.S. Patent 2,720,300. In this known type of centrifugal-force controlled sheave or clutch, the radial motion of those coupling members that provide the power transmission between the driving and the driven parts depends upon an additional motion acting in the direction of the coupling axis, the additional motion being damped by a liquid-displacing dash-pot device which includes a damper piston with a return spring and an exteriorly adjustable regulatable escape valve. The centrifugal forces, produced when the driving member of the coupling device starts running, act upon a pressure-transmitting body which then moves in the direction of the coupling axis with a displacement velocity controlled by the above-mentioned damper piston.

The above-mentioned prior patents more particularly describe a belt sheave in which the radial motion of the coupling members is released as soon as the axial additional motion has extended over a given travel distance. When the coupling members are released they establish the force-transmitting connection, the torque transmitted being dependent upon the design of the coupling, the type of the linings used in the coupling, as well as upon the amount of centrifugal force. For that reason such a device must be designed and rated for the torque to be transmitted in each particular case.

It is an object of my invention to eliminate this disadvantage, and, particularly, to devise a centrifugal-force transmission device, such as a belt sheave, clutch, or friction coupling which can be used for drive motors of greatly different power capacity without special dimensioning of the coupling components.

A delayed-action centrifugal-force transmission device according to the present invention is somewhat similar, in basic principle, to that known from the above-mentioned U.S. Patent 2,720,300. That is, in the device according to my present invention the coupling members which establish the force-transmitting connection between the driving and driven parts are also dependent upon an additional motion acting in the direction of the coupling axis, and this additional motion is likewise damped by means of a device arranged in the direction of the coupling axis and comprising a liquid-displacing component with a return spring and a regulatable escape valve adjustable from the outside. However, according to the novel features of my invention, such transmission device is so designed that the volume of the space for receiving the displaced amount of liquid is adjustable from the outside, and the obtainable radial travel of the coupling member is made dependent upon the volume thus adjusted.

According to one of the more specific features of my invention, the radially movable coupling members are in engagement with the axially movable damping device by means of slanting glide surfaces so that a given radial position is correlated to each axial position of the axially movable device. More particularly, the outermost radial position of the coupling members which can be reached is correlated proportionally to the concurrent axial position of the axially movable damping device.

By virtue of these features, a transmission device according to the invention can be adapted in a simple manner to any required maximum torque to be transmitted, by adjusting the displaceable volume of the transmission device, due to the fact that the force with which the coupling members enter into engagement with the driven portion can be adjusted and varied. This is done by correspondingly setting the outermost radial position of the coupling members as desired.

The foregoing and other objects, advantages and features of my invention will be apparent from the following description of the embodiments of the invention illustrated by way of example on the drawing, in which.

Figure 1:
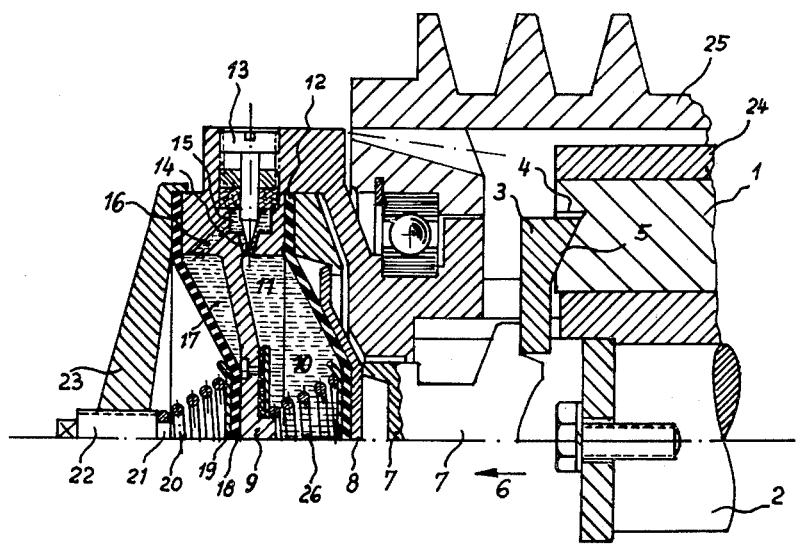
FIG. 1 shows an axial sectional view of one half of a V-belt sheave.
Figure 2:
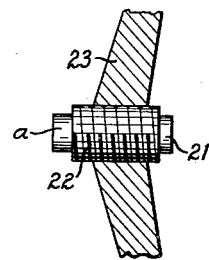
FIG. 2 is an enlarged detail in cross section of the adjusting screw of FIG. 1.

The coupling members of the device illustrated in the drawing consist of a number of peripherally distributed cheeks 1 which are connected with the driving shaft 2 so as to rotate together therewith while having the tendency to move outwardly in a radial direction under the effect of centrifugal force. Such radial motion of cheeks 1 is restrained by a ring 3 which engages an angular groove 4 of triangular cross section formed in the respective cheeks 1. The cheeks 1 and the ring 3 engage each other along their mutual slanting surfaces 5 so as to transmit an axial component of the centrifugal force to the ring 3. The ring 3 thereby presses in the axial direction of the arrow 6 against an axially displaceable, force-transmitting slider body 7, which in turn presses also in the direction of the arrow 6, against a shell 8.

The space 10 between the wall 9 and the shell 8 is filled with a displaceable liquid 11, such as hydraulic fluid or oil, and is sealed off in the direction toward the shaft 2 by means of a flexible diaphragm 12 and abutting part of shell 8. Diaphragm 12 is clamped in tight position around its periphery and may consist of synthetic plastic or other flexible material. The liquid 11 in space 10 has an outlet 14 whose flow cross section can be adjusted by means of a regulatable needle valve 13. The outlet 14 communicates by way of an intermediate chamber 15 and a bore 16 with a variable-volume receiving chamber 17. The receiving chamber 17 is sealed off by means of another flexible diaphragm 18. The diaphragm 18 is engaged by a disc 19 which, under the action of a centrally located compression spring 20, is pressed against the wall 9 so that the receiving chamber 17, at standstill of the sheave 25, has a relatively small volume.

Upon increased centrifugal force in cheeks 1, the slider body 7 exerts pressure, through shell 8, upon the diaphragm 12. Liquid 11 is thus forced from space 10 through the outlet 14 and through the bore 16 into variable-volume chamber 17. The receiving chamber 17 becomes filled with liquid 11 and expands in opposition to the force of spring 20 until the central portion of disc 19 is restrained by the force of spring 20 or, in the event the friction lining 24 has become worn through use, this central portion of disc 19 abuts against the stop 21 of a set screw 22. Thereafter, since diaphragm 18 can move no further to the left, no more liquid can pass from space 10 into the chamber 17.

Depending upon the adjustment or setting of the set screw 22 which pretensions the spring 20, the centrifugal cheeks 1 will now have moved a certain amount to a greater or lesser extent outwardly in a radial direction.

To achieve this setting, the set screw 22 can be turned far enough into the cover 23, which is fastened by screw bolts (not shown) to the wall portion 9 of the device, until the friction linings 24 of the cheeks 1 engage the inner surfaces of the V-belt sheave 25 and thereby entrain the sheave 25. The torque transmitted from cheeks 1 to the sheave 25 can thus be adjusted by properly positioning the stop 21, i.e. by turning the set screw 22 to the proper position.

The liquid chambers 10 and 17 may be stationary or they may rotate together with the driving shaft 2.

As illustrated, the body member which supports diaphragm 12 and chambers 10, 17 has a ball bearing mounted thereon for journalling sheave 25. However, it is further possible to connect the wall member 9 and chambers 10, 17 with the sheave 25 so that the rotation of these chambers is determined by that of the sheave 25.

When the drive is arrested, the shaft 2 and the cheeks 1 will stop. The cheeks 1 are then pulled inwardly by the force of return springs (not illustrated), while the diaphragm 12, the shell or disc 8, the slider body 7 and the ring 3 are forced back by the pressure of compression spring 26 to move in opposition to the direction of the arrow 6. This return motion is aided by the force of return spring 20 which operates to force liquid 11 from chamber 17 back through passages 16, 15, 14 into the space 10 until the original position illustrated is reached, wherein the friction lining 24 is disengaged from sheave 25, and is restrained by the pressure of ring 3 against cheeks 1.

It will be obvious to those skilled in the art, upon studying this disclosure, that my invention permits of a variety of modifications as well as uses, and hence may be embodied in devices other than particularly illustrated and described herein, without departing from the essential features of my invention and within the scope of the claims annexed hereto.

I claim:

1. A centrifugally controlled coupling of selectively time-delayed action, comprising a revolvable driving member, a revolvable driven member, an intermediate coupling member revolvable together with said driving member and radially movable due to centrifugal force into coupling engagement with said driven member, force-transmitting means movable longitudinally relative to said driving member in a given direction parallel to the axis of revolution, said force-transmitting means having a surface in engagement with said intermediate member for limiting the radial motion of the latter depending upon the longitudinal motion of said force-transmitting means and to hold said intermediate member disengaged from said driven member when said driving member is at rest, adjustable time-delay means comprising a damping device having fluid-displacing means operatively connected with said force-transmitting means for movement by said force-transmitting means in said given direction, said damping device being provided with a variable volume hydraulic chamber cooperating with said fluid-displacing means to receive hydraulic fluid displaced thereby, and adjustment means accessible from the outside of said coupling for adjusting the maximum volume of said chamber, whereby the amount of radial motion of said intermediate member will depend upon the adjusted maximum volume of said chamber.

2. A centrifugally controlled coupling according to claim 1, said revolvable driven member forming a housing coaxial with said driving member, and said axially movable damping device being journalled relative to said housing so as to be revolvable together with said driving member.

3. A centrifugally controlled coupling of selectively time-delayed action and adjustable torque-transmitting limit, comprising a revolvable driving member, a revolvable driven member forming a housing coaxial with said driving member and enclosing said driving member, an intermediate member mounted on said driving member within said housing and being centrifugally movable relative to said driving member into coupling engagement with said driven member, force-transmitting means movable longitudinally relative to said driving member in a given direction parallel to the axis of revolution, said force-transmitting means having a surface in engagement with said intermediate member for limiting the radial motion of the latter depending upon the longitudinal motion of said force-transmitting means and to hold said intermediate member disengaged from said driven member when said driving member is at rest, adjustable time-delay means comprising a damping device having liquid displacing means operably connected with said force-transmitting means for axial displacement thereby within said housing in said given direction, said damping device being provided with a variable volume hydraulic chamber cooperating with said liquid-displacing means to receive hydraulic fluid displaced thereby, and with escape valve means adjustable from outside the coupling and disposed in the path of flow of fluid between said displacing means and said chamber for adjusting the rate of flow of fluid therebetween so as to control the time-delayed action of the coupling, a return spring for urging said liquid-displacing means opposite to said given direction, and adjustment means accessible from the outside of said coupling for adjusting the volume limit of said chamber, whereby the amount of radial motion of said intermediate member and the radial force component holding same in coupling engagement with said driven member will depend upon the adjusted volume limit of said chamber.

4. A centrifugally controlled coupling of selectively time-delayed action and adjustable torque-transmitting limit, comprising a revolvable driving member, a revolvable driven member forming a housing coaxial with said driving member and enclosing said driving member, an intermediate member mounted on said driving member within said housing and being centrifugally movable relative to said driving member into coupling engagement with said driven member, force-transmitting means movable longitudinally relative to said driving member in a given direction parallel to the axis of revolution, said force-transmitting means and said intermediate member having mutually engaging slanting surfaces for transmitting an axial component of the radial centrifugal force to said force-transmitting means and for holding said intermediate member disengaged from said driven member when said driving member is at rest, a damping device having axially movable liquid-displacing means operably connected with said force-transmitting means for axial displacement thereby within said housing in said given direction, and a return spring axially urging said liquid-displacing means and said force-transmitting means in opposition to said axial force component, said damping device being provided with a variable volume hydraulic chamber communicating with said liquid-displacing means to receive hydraulic fluid displaced thereby, and with escape valve means adjustable from outside the coupling and disposed in the path of flow of fluid between said displacing means and said chamber for adjusting the rate of flow of fluid therebetween, and adjustment means regulatable from outside said coupling for adjusting the volume limit of said chamber, said mutually engaging surfaces and said return spring respectively holding said damping device and said intermediate member in operative connection with said intermediate member in either axial direction of movement of said force-transmitting member, whereby each axial position of said liquid-displacing means will be correlated to a corresponding radial position of the intermediate member to control the coupling engagement of the latter with said driven member.

5. In a centrifugal coupling according to claim 4, at least a portion of said damping device being axially displaceable by said force-transmitting means, and said adjustment means being positioned to limit the axial travel of said portion, whereby the radial position of the intermediate coupling member is proportional to the adjusted axial position of said portion of said damping device.

6. In a centrifugal coupling according to claim 4, said damping device having resiliently movable means forming one wall of said variable volume chamber and comprising a flexible diaphragm having a portion thereof axially and resiliently movable as said chamber receives fluid from said liquid-displacing means, said resiliently movable means cooperating with said adjustment means to limit the axial travel motion of said diaphragm portion in accordance with the setting of said adjustment means.

7. In a centrifugal coupling according to claim 4, said damping device having a flexible diaphragm forming one wall of said variable volume chamber, resilient means positioned between said adjustment means and a portion of said one wall for urging said wall portion toward said chamber so as to tend to decrease the volume of said chamber, and means cooperating with said adjustment means to limit the axial travel motion of said wall portion and thus limit the volume of said chamber in accordance with the setting of said adjustment means.

8. In a centrifugal coupling according to claim 4, said damping device having a first flexible diaphragm forming a portion of said liquid-displacing means, and a second flexible diaphragm forming one wall of said variable volume chamber, resilient means positioned between said adjustment means and a portion of said one wall for urging said wall portion toward said chamber so as to tend to decrease the volume of said chamber, said adjustment means comprising a set screw having abutment means at the terminal end thereof and adjustable in said axial direction, and means cooperating with said abutment means to limit the axial travel motion of said wall portion and thus limit the volume of said chamber in accordance with the setting of said set screw.

9. A centrifugally controlled belt sheave, comprising a revolvable driving member, a revolvable driven sheave member forming a housing coaxial with said driving member and enclosing said driving member, an intermediate member mounted on said driving member within said housing and being centrifugally movable relative to said driving member into coupling engagement with said driven member, force-transmitting means movable longitudinally relative to said driving member in a given direction parallel to the axis of revolution, said force-transmitting means and said intermediate member having mutually engaging slanting surfaces for transmitting an axial component of the radial centrifugal force to said force-transmitting means and for holding said intermediate member disengaged from said sheave member when said driving member is at rest, a damping device having axially movable liquid-displacing means operably connected with said force-transmitting means for axial displacement thereby within said housing in said given direction, and a return spring axially urging said liquid-displacing means and said force-transmitting means in opposition to said axial force component, said damping device being provided with a variable volume hydraulic chamber communicating with said liquid-displacing means to receive hydraulic fluid displaced thereby, and with escape valve means adjustable from outside the coupling and disposed in the communication path between said displacing means and said chamber for adjusting the rate of flow of fluid therebetween, and adjustable means for limiting the volume of said chamber, whereby the amount of radial motion of said intermediate member and the radial force component holding same in coupling engagement with said driven sheave member will depend upon the adjusted volume limit of said chamber.

References Cited in the file of this patent
UNITED STATES PATENTS

| 1,374,413 | Webb | Apr. 12, 1921 |
| 2,720,300 | Muhlbeyer | Oct. 11, 1955 |

FOREIGN PATENTS

| 151,414 | Great Britain | Sept. 30, 1920 |